June 4, 1940.  J. G. CAPSTAFF  2,203,651
COLOR PROCESS AND CAMERA THEREFOR
Filed July 2, 1938
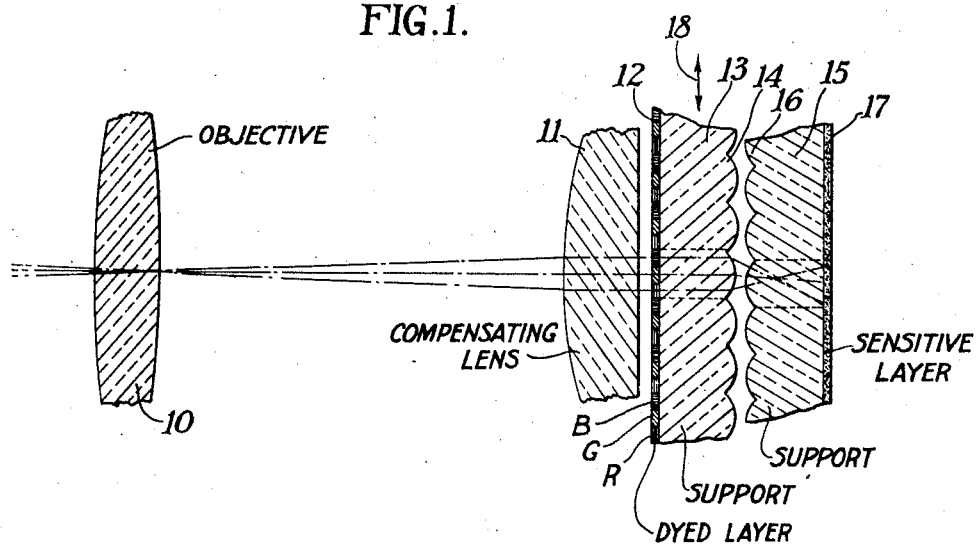
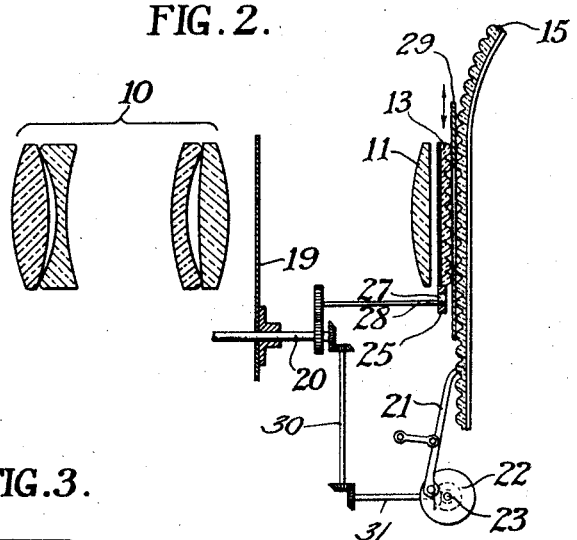
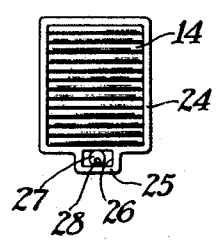
Inventor
John G. Capstaff Patented June 4, 1940

2,203,651

UNITED STATES PATENT OFFICE 2,203,651

COLOR PROCESS AND CAMERA THEREFOR

John G. Capstaff, Rochester, N. Y., assignor to Eastman Kodak Company, Rochester, N. Y., a corporation of New Jersey Application July 2, 1938, Serial No. 217,290

2 Claims. (Cl. 88—16.4)

This invention relates to photographic color processes and, more particularly, to such processes employing lenticular film in which the several color separation images occupy individual areas on the smooth face of a support and in registration with the lenticulations provided on the other face of the support. The invention also relates to a camera optical system for practicing the process.

When pictures are taken on lenticular film through a multi-color filter associated with the camera objective, the colored areas of the filter normally see the subject being photographed from different viewpoints. Pictures made in this manner are now known to possess a defect which appears in projection as color fringes on out-of-focus objects. This defect is believed to be due to the stereo parallax between the different color areas of the filter associated with the objective and several arrangements have been devised for eliminating this defect.

The present invention provides a method for eliminating this defect and, in addition thereto, makes it possible to record pictures on lenticular film without the necessity of providing a camera objective which must meet special requirements, such as a predetermine relative aperture or the apparent position of the multi-color filter as viewed by the film.

In accordance with my invention, the natural color image formed by an objective is sub-divided into a plurality of line images corresponding in size and color to the separation images desired to be recorded and these line images are then re-imaged in registration with lenticulations and in the sensitive emulsion carried by a lenticular support. The means for sub-dividing the image into line images is preferably a lenticular screen consisting of a transparent support with lenticular elements on its rear face and provided on its front face with a three-color line screen (when the process is a three-color one) in registration with such lenticulations. This registration of the three-color line screen is most easily obtained by making it with the aid of the lenticulations, such as by printing through the lenticulations onto a suitable sensitive material, such as bi-chromated fish glue or gelatin, and dyed by a suitable dyeing process so that directly opposite each lens surface there is a three-color filter which occupies the same relative positions with respect to such lens as the color separation images occupy with respect to the lenticular film employed in the process.

The novel features which I believe to be characteristic of my invention are set forth in the appended claims. The invention itself, however, will be best understood by reference to the following description when read in connection with the accompanying drawing in which, Fig. 1 shows on an enlarged scale an optical arrangement for exposing a sensitive lenticular film;

Fig. 2 is a conventional showing of the necessary parts of a camera for practicing the invention; and Fig. 3 shows a suitable arrangement for imparting a reciprocating movement to the lenticular color screen member.

The arrangement shown in Fig. 1 for practicing the invention comprises a suitable camera objective 10 which, with or without a suitable compensating lens 11, forms an image behind the lens 11. This lens 11 may serve to flatten the field of the objective and also, as is well known, it is usually given a focal length equal to its separation from the objective 10 so that the light is collimated to cause the filter images to occupy the same relative position with respect to the lenticulations forming these images. A three-color line screen 12 is positioned in the plane of this image and is carried by a transparent support 13 provided on its other surface with a plurality of lenticulations 14. Immediately behind the color screen member 13 is positioned a sensitive lenticular film 15 provided on its front face with lenticulations 16 and on its rear face with a sensitive emulsion 17, as is well known. The color screen layer 12 comprises a plurality of groups of color filters B, G, and R, which may be blue, green and red, respectively, and each of these groups of filters are accurately registered in the focal plane of a lenticulation 14 carried by a transparent support 13. As indicated above the registration of these filters may be most easily obtained by employing in their formation the lenticular elements 14.

It will be understood that the lenticulations 14 and 16 are of substantially the same size and that the supports 13 and 15 have a thickness equal to the focal length of the lenticulations 14 and 16, respectively. Thus, it is clear that the color screen 12 carried by the support 13 occupies the focal plane of each of the lenticulations 14 and that the sensitive layer 17 occupies the focal plane of each of the lenticulations 16.

The light in the color image formed by the objective and coinciding with the filter layer 12 is transmitted by the support 13 and refracted by the lenticulations 14 to collimate separately the light coming from each group of three line filters. This light is collimated because the lenticulations 14 are preferably so formed and positioned that the filter layer 12 lies in their focal planes.

The plurality of beams of collimated light coming from lenticulations 14 are received by the lenticulation 16 carried by the film 15 and imaged in the sensitive layer 17 as indicated in the drawing showing the central rays of a plurality of light beams. This image in the sensitive layer 17 is of the color screen 12 and its variations in intensity are determined by the light and color values in different parts of the image formed by the objective 10.

If the lenticulations 14 of the color screen 13 are not precisely located with respect to the sensitive film lenticulations 16 a moiré pattern would probably result and, in order to eliminate this, the screen 13 during each exposure of the sensitive film 15 is oscillated in its plane and perpendicular to the axes of its lenticulations 14 as indicated by the double headed arrow 18. The extent of this oscillating movement is either a distance which is an exact integral number of times the width of one lenticulation or a distance which is equal to the width of a large number of lenticulations.

In Fig. 2 the optical arrangement described in connection with Fig. 1 is illustrated as it may be employed in a motion picture camera. In the interest of clarity only the essential parts of such motion picture camera are illustrated. As here shown a shutter 19 rotatable with a suitable shaft 20 is positioned between the objective 10 and the sensitive lenticular film 15 for controlling the time of each exposure in a well known manner. For defining the picture frame image on the sensitive film 15 an exposure window 29 is positioned in front of this film and behind the oscillating screen 13. Any suitable means may be provided for advancing the film 15 step by step and is here shown as an ordinary pull down claw 21 adapted to be actuated by a crank wheel 22 carried on a shaft 23. It will be understood that the camera will be provided with a suitable driving mechanism coupled to both the shafts 20 and 23 so as to drive them in proper timed relation.

The color screen member 13, as more clearly shown in Fig. 3, may be mounted in a suitable supporting frame 24 and located between the compensating lens 11 and the sensitive film 15. Any means suitable for imparting the necessary oscillating movement to the screen 13 may be provided and one convenient arrangement is shown as comprising the frame 24 having formed therewith a slotted projection 25 in the slot 26 of which is positioned an eccentric cam 27 carried by a shaft 28. Rotation of the shaft 28 and its eccentric cam 27 will impart to the screen 13 a movement transverse to its cylindrical lenticulations 14 and the eccentricity of the cam 27 is chosen to make this movement at least equal to the width of a single embossing 14. This movement of the screen 13 must take place during an exposure and, accordingly, the actuating shaft 28 will be suitably coupled to the camera driving mechanism to be driven in timed relation to the shutter shaft 20 and the pull down shaft 23. One such coupling is shown in Fig. 2 where the shaft 28 is geared to the shutter shaft 20, which in turn is connected in driving relation with the pull down crank shaft 23 through shafts 30 and 31 and their associated gears.

Although I have illustrated and described my invention as applied to a lenticular film process employing the three colors, red, green, and blue, it is obviously equally applicable to similar processes employing different colors as well as a different number of colors and also may be employed to record stereoscopic views.

While I have described in detail one embodiment of my invention, it is to be understood that the invention is not thereby limited for various modifications will readily suggest themselves to those skilled in the art without departing from my invention as defined in the appended claims.

What I claim as new and desire to secure by Letters Patent of the United States is:

1. A photographic camera for exposing lenticular color film comprising in operative combination, an image forming objective, an exposure window in the path of light transmitted by the objective, and a color screen in front of and adjacent to said window, said screen comprising a transparent support provided on its rear surface with lenticulations of substantially the same size as the lenticulations on the film to be exposed and provided on its front surface with a three color line screen in registration with each lenticulation on its other surface said support having a thickness substantially equal to the focal length of its lenticulations, whereby when a sensitive lenticular film is placed in said window with its lenticulations facing light transmitted by the objective said color screen is imaged in the sensitive layer behind each lenticulation of said film, shutter means operable to expose intermittently said film to light transmitted by the objective, means for advancing said film between exposures, and means actuated in timed relation with said shutter means for moving said screen in its plane and perpendicular to the axes of its lenticulations during each exposure a distance at least equal to the width of one lenticulation.

2. The method of producing latent color separation images in a sensitive emulsion on a support and in registration with lenticulations carried by the support which comprises forming in natural colors an image on a plurality of groups of filters corresponding in size and color to the separation images to be recorded, separately collimating the light transmitted by each group of said filters, exposing the emulsion through its lenticular support to the collimated light and during the exposure shifting all of said filters so that the emulsion behind each lenticulation on the support receives all of the light transmitted by at least two adjacent groups of filters.

JOHN G. CAPSTAFF.